United States Patent [19]

Copelin

[11] Patent Number: 4,500,705

[45] Date of Patent: Feb. 19, 1985

[54] METHOD FOR REDUCING OLIGOMERIC CYCLIC ETHER CONTENT OF A POLYMERIZATE

[75] Inventor: Harry B. Copelin, Wilmington, Del.

[73] Assignee: E. I. Du Pont de Nemours and Company, Wilmington, Del.

[21] Appl. No.: 569,572

[22] Filed: Jan. 9, 1984

[51] Int. Cl.$^3$ .......................... C08J 3/00; C07C 43/11
[52] U.S. Cl. .................................. 528/417; 528/421; 528/497; 528/498; 568/617; 568/621
[58] Field of Search ............... 528/417, 421, 497, 498; 568/617, 621

[56] References Cited

U.S. PATENT DOCUMENTS

| | | | |
|---|---|---|---|
| 3,478,109 | 11/1969 | McConnell | 568/621 X |
| 3,823,145 | 7/1974 | Louvar et al. | 568/621 X |
| 4,202,964 | 5/1980 | Prukmayr et al. | 528/417 X |
| 4,251,654 | 2/1981 | Robinson et al. | 528/417 |
| 4,306,058 | 12/1981 | Copelin | 528/498 |

*Primary Examiner*—Earl A. Nielsen

[57] ABSTRACT

The oligomeric cyclic ether content of a tetrahydrofuran-, an alkylene oxide-, or a tetrahydrofuran/alkylene oxide polymerizate can be reduced by bringing the polymerizate into contact with an aliphatic- or cycloaliphatic hydrocarbon of 6–8 carbon atoms, and separating the polymerizate and the hydrocarbon phases.

3 Claims, No Drawings

METHOD FOR REDUCING OLIGOMERIC CYCLIC ETHER CONTENT OF A POLYMERIZATE

DESCRIPTION

Technical Field

This invention relates to a method for reducing the oligomeric cyclic ether (OCE) content of a tetrahydrofuran- (THF), an alkylene oxide- (AO), or a THF/AO polymerizate. It is more particularly directed to a method whereby the OCE content of such a polymerizate can be reduced by bringing it into contact with a particular type of hydrocarbon.

BACKGROUND AND SUMMARY OF THE INVENTION

Homopolymers of THF and of alkylene oxides, and copolymers of THF and alkylene oxides, are known and can be used as soft segment glycols in the preparation of polyurethanes. Processes disclosed in the art for producing such polymers, like that shown in British Pat. No. 845,958, also produce OCE byproducts, which may constitute as much as 7–15%, by weight, of a polymerizate.

The presence of these oligomeric cyclic ethers in a polymerizate can be undesirable for several reasons. First, the ethers are nonfunctional impurities and can represent an economic penalty to a purchaser of a polymerizate because up to 7–15%, by weight, of the material purchased contains no reactive hydroxyl groups and may therefore be useless for the purposes intended. Secondly, when such a polymerizate is used in preparing a polyurethane, the ethers tend to degrade the polyurethane's properties. This degradation manifests itself in much the same way as that encountered when an excess of plasticizer is used: the lower molecular weight oligomeric cyclic ethers vaporize slowly at elevated temperatures and are leached out by water and common organic liquids, which results in weight loss and undesirable dimensional changes in the polyurethane product.

A need therefore exists for a simple, inexpensive method for reducing the OCE content of a THF-, an AO-, or a THF/AO polymerizate. This need is filled by the process of the invention, whereby the OCE content of such a polymerizate is reduced by bringing it into contact with a particular type of hydrocarbon.

DETAILED DESCRIPTION OF THE INVENTION

The hydrocarbons used in the process of the invention are the aliphatic- and cycloaliphatic hydrocarbons of 6–8 carbon atoms. These hydrocarbons can be unsubstituted or substituted with one or more methyl or ethyl groups. Illustrative are n-heptane, n-octane, cyclohexane and methylcyclohexane. n-Heptane is preferred. Mixtures of hydrocarbons can also be used.

The polymerizate whose OCE content is reduced according to the invention can be any of those produced by the known methods of preparing THF homopolymers, AO homopolymers or THF/AO copolymers. Illustrative of such methods are those shown in U.S. Pat. No. 3,425,999 to Axelrood and Lajiness and U.S. Pat. No. 4,071,492 to Bethea and Futamura. The disclosures of these documents are incorporated into this application to show how such polymerizates are prepared.

"Alkylene oxide," as used here, means a compound containing two or three carbon atoms in its alkylene oxide ring. The alkylene oxide can be unsubstituted or substituted with, for example, alkyl or aryl groups or halogen atoms. Illustrative of such alkylene oxides are ethylene oxide, 1,2-propylene oxide, 1,3-propylene oxide, 1,2-butylene oxide, 1,3-butylene oxide, 2,2-bis-chloromethyl-1,3-propylene oxide and epichlorohydrin. The polymerizates most commonly treated according to the invention are THF/ethylene oxide polymerizates and THF/1,2-propylene oxide polymerizates.

The polymerizate will ordinarily have most of the unreacted monomers removed, only insignificant amounts remaining. This can be done by distillation, using conventional procedures.

In the usual case the untreated polymerizate will contain about 7–15%, by weight, of the cyclic ethers, and in some cases may contain as much as 15–18%.

As used here, "oligomeric cyclic ether" means a compound having a calculated molecular weight of no more than about 500 and containing two or more of the following units linked together:

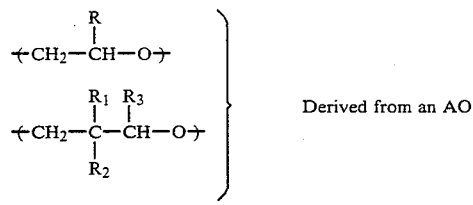

$\{CH_2-CH(R)-O\}$ $\{CH_2-C(R_1)(R_2)-CH(R_3)-O\}$ Derived from an AO $\{CH_2-CH_2-CH_2-CH_2-O\}$ Derived from THF where R, $R_1$, $R_2$, and $R_3$ are hydrogen, methyl, ethyl, or halomethyl.

Illustrative of such oligomeric cyclic ethers are those represented in the following table:

| Composition Number Ratio of AO Units to THF Units | |
| --- | --- |
| 2:1 | 1:4 |
| 1:2 | 3:3 |
| 3:1 | 5:2 |
| 2:2 | 2:4 |
| 4:1 | 4:3 |
| 1:3 | 6:2 |
| 3:2 | 3:4 |
| 5:1 | 5:3 |
| 2:3 | 2:5 |
| 4:2 | 4:4 |

The process of the invention is conducted by bringing the hydrocarbon into intimate contact with the polymerizate, ordinarily by mixing a suitable amount of hydrocarbon and polymerizate and then stirring or otherwise agitating the mixture. The rate of stirring is a matter of choice and convenience. Generally, the higher the rate the greater is the rate of OCE extraction and the amount extracted, but one must keep in mind that higher rates of agitation may also increase the amount of hydrocarbon entrained in the polymerizate. It may be necessary to remove this entrained hydrocarbon later in the procedure.

The hydrocarbon/polymerizate ratio is of secondary importance. The greater the amount of hydrocarbon used, the more efficient is the removal of OCE, but again, this may also lead to greater hydrocarbon entrainment. Generally, a hydrocarbon/polymerizate ratio (volume) of 1:1–4:1 is used.

The temperature at which the process is performed is likewise of secondary importance. The practical limits can be the freezing and boiling points of the hydrocarbons used. In most cases, maintaining the temperature of the hydrocarbonpolymerizate mixture at about 20°–60° C. will give satisfactory results.

After the desired amount of OCE has been removed from the polymerizate, as determined by periodic sampling and analysis, the two phases (polymerizate and hydrocarbon containing OCE) are separated by decantation or centrifugation.

The process of the invention can be performed batchwise or continuously, as for example in a column using countercurrent flow of hydrocarbon and polymerizate.

However the process is performed, hydrocarbon entrainment in the final product usually does not exceed about 15% by volume. This entrained hydrocarbon can be removed from the polymerizate, if desired, by conventional chemical engineering procedures.

By using the process of the invention, one can reduce the OCE content of a polymerizate to any desired level, even one which stands on the threshold of detection. In the batchwise variation, this is done by repeating the procedure a sufficient number of times. In the continuous variation, it is done by varying the length of the column, the hydrocarbon/polymerizate ratio, and the residence time of the polymerizate in the column, as will be understood by those skilled in the art.

OCE content is determined by programmed gas chromatography, using a stainless steel column having a length of 3.045 meters (10 feet) and an outside diameter of 3.175 mm (⅛ inch), packed with 5% by weight of "OV-101," a methyl silicone oil sold by Supelco, Inc., supported on 100–120 U.S.S. mesh "Chromsorb G," sold by Hewlett-Packard, Inc. The column is in an oven whose temperature is programmed to rise from 70° to 300° C. at the rate of 30° C. per minute, with a 12 minute hold time at 300° C. before the cycle is repeated. The column has a glass liner for the injection port, which must be replaced frequently to prevent contamination of the port with nonvolatile fractions of sample. The instrument may be equipped with an integrator to determine the concentration of unknown in the sample.

The determination is conducted under the following conditions:

| | |
|---|---|
| Injection port temperature | 280° C. |
| Thermal conductivity detector setting | 320° C. α 150 milliamperes |
| Carrier gas & gas flow | Helium α 30 cc per minute |
| Sample size | 10 microliters |
| Internal standard | Dimethyl ether of triethylene glycol |

The procedure is standardized by first preparing three standard solutions containing, respectively, 2%, 5%, and 10%, by weight, of purified OCE in THF. A sample of each standard solution is then prepared by measuring into a sample bottle 1.00 gram of the standard solution, 0.10 gram of the dimethyl ether of triethylene glycol and 10 ml of reagent grade toluene, and then shaking the bottle. Duplicates of each sample are injected in turn into the chromatograph, which is then run under the previously mentioned conditions.

The response factor (RF) of the determination is then calculated for each sample according to the equation $$RF = \frac{(\% \ OCE \ \text{in standard})(\text{area} \ \% \ \text{of internal standard}) \times (\text{weight of standard solution})}{(\text{area} \ \% \ \text{of} \ OCE)(\text{weight of internal standard})(100)}$$

Average response factor, $RF_a$, is found by averaging the six response factors thus calculated.

The determination of OCE content is carried out by first preparing a sample of THF/AO polymerizate of unknown OCE content by measuring into a sample bottle 1.00 gram of solvent-free polymerizate, 0.10 gram of internal standard and 10 ml of reagent grade toluene, and then shaking the bottle. The sample is then injected into the chromatograph which is then run under the previously mentioned conditions. OCE content is calculated from the results according to the equation $$\text{Weight percent of } OCE = \frac{\text{area} \ \% \ \text{of } OCE}{\text{area} \ \% \ \text{of internal standard}} \times 10RF$$

Purified OCE is obtained by first distilling a raw THF/AO polymerizate (the AO being the same as that in the copolymer of the unknown) in a 5.08 cm (2-inch) Pope wiped film molecular still, sold by Pope Scientific, Inc., Menomonee Falls, Wis. The distillation is carried out at 170°–190° C. and a pressure of less than about 26 Pa (0.2 mm of mercury), with an input rate of about 1 drop per second.

Two hundred parts by weight of the distillate are mixed with 60 parts by weight of 2,4-toluene diisocyanate and 3 drops of dibutyltin dilaurate and the mixture held at ambient temperature, with stirring, until the exothermic reaction subsides. The mixture is then held at 100° C. for two hours, with stirring, and its free isocyanate content determined by titration with di-n-butylamine, as described in Analytical Chemistry of the Polyurethanes, Volume XVI, Part III, D. J. David and R. B. Staley, Wiley-Interscience, 1969, pages 357–359. Enough ethylene glycol to give an isocyanate/hydroxyl mole ratio of about 1/1 is added to the mixture, which is then brought to 100° C. and held there for two hours, with stirring, to complete conversion to a polyurethane.

The resulting mixture containing the inert OCE is then extracted with diethyl ether and the extract concentrated on a rotary evaporater at 100° C. and a pressure of about 1333 Pa (10 mm of mercury). The concentrate is then distilled in the Pope molecular still at 170°–190° C. and a pressure of less than about 26 Pa (0.2 mm of mercury) and an input rate of about 1 drop per second. The distillate is purified OCE.

After the OCE content of a polymerizate has been reduced according to the invention, the polymerizate can be used for whatever purpose intended, without further processing or treatment.

EXAMPLE

Twenty five grams of a THF/ethylene oxide polymerizate having a molecular weight of 1118 and containing 10.3% by weight of oligomeric cyclic ethers, was mixed with 50 ml of n-heptane. The mixture was shaken for one minute at room temperature and then allowed to settle. After the phases had separated, the heptane phase was decanted and the procedure repeated.

The resulting polymerizate contained 1.44% by weight of oligomeric cyclic ethers.

I claim:

1. A method for reducing the oligomeric cyclic ether content of a tetrahydrofuran-, an alkylene oxide-, or a tetrahydrofuran/alkylene oxide polymerizate, the method comprising bringing the polymerizate into contact with an aliphatic- or cycloaliphatic hydrocarbon of 6–8 carbon atoms, or an aliphatic- or cycloaliphatic hydrocarbon of 6–8 carbon atoms substituted with one or more methyl or ethyl groups, for a time sufficient to bring the oligomeric cyclic ether content of the polymerizate to the desired level, and then separating the polymerizate and the hydrocarbon.

2. The method of claim 1 in which the hydrocarbon is n-heptane, n-octane, cyclohexane, or methylcyclohexane.

3. The method of claim 1 in which the hydrocarbon is n-heptane.